US010776002B2

(12) United States Patent
Liu (10) Patent No.: US 10,776,002 B2
(45) Date of Patent: Sep. 15, 2020

(54) METHOD AND APPARATUS FOR INPUTTING A TEXT

(71) Applicant: Baidu Online Network Technology (Beijing ) Co., Ltd., Beijing (CN)

(72) Inventor: Yelu Liu, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 710 days.

(21) Appl. No.: 15/425,185

(22) Filed: Feb. 6, 2017

(65) Prior Publication Data
US 2018/0024734 A1 Jan. 25, 2018

(30) Foreign Application Priority Data

Jul. 19, 2016 (CN) .......................... 2016 1 0569872

(51) Int. Cl.
*G06F 3/0488* (2013.01)
*G06F 40/166* (2020.01)
*G06F 40/232* (2020.01)
*G06F 3/0489* (2013.01)

(52) U.S. Cl.
CPC ...... *G06F 3/04886* (2013.01); *G06F 3/04895* (2013.01); *G06F 40/166* (2020.01); *G06F 40/232* (2020.01); *G06F 2221/2133* (2013.01)

(58) Field of Classification Search
CPC .... G06F 17/24; G06F 17/273; G06F 3/04886; G06F 3/048895; G06F 40/166; G06F 40/232
See application file for complete search history.

(56) References Cited

U.S. PATENT DOCUMENTS

| 7,707,642 B1* | 4/2010 | Herbach | G06F 21/6227 726/27 |
| 7,725,359 B1* | 5/2010 | Katzfey | G06Q 30/0603 705/26.1 |
| 2011/0137518 A1* | 6/2011 | Abe | G07C 5/085 701/33.4 |
| 2013/0132718 A1* | 5/2013 | Agrawal | H04L 9/3268 713/158 |
| 2014/0208255 A1* | 7/2014 | Kim | G06F 3/0236 715/773 |
| 2014/0282203 A1* | 9/2014 | Pasquero | G06F 3/04886 715/773 |

(Continued)

FOREIGN PATENT DOCUMENTS

| CN | 102495679 A | 6/2012 |
| CN | 105446516 A | 3/2016 |

*Primary Examiner* — Thu V Huynh
(74) *Attorney, Agent, or Firm* — McCarter & English, LLP (57) ABSTRACT

The present application discloses a method and apparatus for inputting a text. An embodiment of the method comprises: receiving a prompt text from a connected backend server, the prompt text including a defined content segment and a user name of a user logged on the server; acquiring the user name of the user from login information of the user; extracting the defined content segment from the prompt text based on the acquired user name; distributing characters in the prompt text randomly to virtual keys on a virtual keyboard; displaying a typed character, in response to an operation by the user to type a character based on the prompt text by clicking a virtual key. The embodiment enables quick and accurate input of a prompt text.

15 Claims, 5 Drawing Sheets

(56) References Cited

U.S. PATENT DOCUMENTS

| | | | |
|---|---|---|---|
| 2015/0066784 A1* | 3/2015 | Powers | G06Q 50/18 705/311 |
| 2015/0079954 A1* | 3/2015 | Schaeffer | H04M 3/4872 455/414.1 |
| 2016/0124970 A1* | 5/2016 | Hwang | G06F 16/3322 707/767 |
| 2016/0254000 A1* | 9/2016 | Thalanany | H04L 63/0861 704/273 |
| 2017/0132738 A1* | 5/2017 | Geller | G06F 16/9558 |
| 2017/0262540 A1* | 9/2017 | Anhalt | G06Q 50/182 |
| 2017/0293407 A1* | 10/2017 | Todasco | G06F 3/13 |

* cited by examiner

METHOD AND APPARATUS FOR INPUTTING A TEXT

CROSS-REFERENCE TO RELATED APPLICATION

This application claims the priority of Chinese Patent Application No. 201610569872.9, entitled "Method and Apparatus For Inputting a Text," filed on Jul. 19, 2016, the content of which is incorporated herein by reference in its entirety.

TECHNICAL FIELD

The present application relates to the field of mobile terminal technology, specifically to the field of input method technology, and more specifically to a method and apparatus for inputting a text.

BACKGROUND

In the current business of Internet finance, the ability to control the risk determines the development advancement of a financial business. Risk control refers to the various measures and methods taken by a risk manager, to eliminate or lower the various possibilities of risk events, or by a risk controller to reduce the loss when the risk events occur. In the Internet loan business, the on-line process of inputting a risk class notification letter parallel to the traditional business still requires a user to enter character by character by comparison according to the risk control requirement, to ensure that the user clearly understands obligations and to avoid risks. However, the current input method still uses the traditional keyboard mode. There is still no good solution to improve the user's operational efficiency in restricted conditions.

The current risk control require a defined content text and a person's actual name be entered manually, and the entry process cannot be omitted. There is no feasible alternative as to how to expeditiously improve the spelling efficiency of Chinese characters on a mobile terminal.

SUMMARY

An objective of the present application is to provide a method and apparatus for inputting a text, in order to solve the technical problem mentioned in the foregoing Background section.

In a first aspect, the present application provides a method for inputting a text, comprising: receiving a prompt text from a connected backend server, the prompt text including a defined content segment and a user name of a user logged on the server; extracting the defined content segment from the prompt text based on the acquired user name; distributing characters in the prompt text randomly to virtual keys on a virtual keyboard; displaying a typed character, in response to an operation by the user to type a character based on the prompt text by clicking a virtual key.

In some embodiments, the method further includes: setting the virtual key displaying the typed character to a non-clickable state, in response to the operation by the user to type the character based on the prompt text by clicking the virtual key; setting the virtual key displaying a deleted character to a clickable state, in response to an operation by the user to delete a character by clicking the virtual key.

In some embodiments, the method further includes: detecting whether the displayed character matches the character at a corresponding position in the prompt text; indicating an input character error, in response to detecting the displayed character mismatching the character at the corresponding position in the prompt text.

In some embodiments, the indicating an input character error includes: displaying an incorrectly input character in a color different from a color of a correctly input character.

In some embodiments, characters included in the user name and characters included in the defined content segment are mixed.

In some embodiments, the virtual keyboard is arranged in a grid form, and characters included in the user name are displayed on consecutive virtual keys.

In some embodiments, the displaying the typed character includes: displaying a complete user name, in response to clicking by the user on any one character in the user name displayed on the virtual keyboard.

In a second aspect, the present application provides an apparatus for inputting a text, comprising: a reception unit, configured to receive a prompt text from a connected backend server, the prompt text including a defined content segment and a user name of a user logged on the server; an acquisition unit, configured to acquire the user name of the user from login information of the user; a processing unit, configured to extract the defined content segment from the prompt text based on the acquired user name; a distribution unit, configured to distribute characters in the prompt text randomly to virtual keys on a virtual keyboard; a display unit, configured to display a typed character, in response to an operation by the user to type a character based on the prompt text by clicking a virtual key.

In some embodiments, the apparatus further includes: a control unit, configured to set the virtual key displaying the typed character to a non-clickable state, in response to the operation by the user to type the character based on the prompt text by clicking the virtual key; set the virtual key displaying a deleted character to a clickable state, in response to an operation by the user to delete a character by clicking the virtual key.

In some embodiments, the apparatus further includes: a detection unit, configured to detect whether the displayed character matches the character at a corresponding position in the prompt text; an indication unit, configured to indicate an input character error, in response to detecting the displayed character mismatching the character at the corresponding position in the prompt text.

In some embodiments, the indication unit is further configured to: display an incorrectly input character in a color different from a color of a correctly input character.

In some embodiments, characters included in the user name and characters included in the defined content segment are mixed.

In some embodiment, the virtual keyboard is arranged in a grid form, and characters included in the user name are displayed on consecutive virtual keys.

In some embodiments, the display unit is further configured to: display a complete user name, in response to clicking by the user on any one character in the user name displayed on the virtual keyboard.

With the method and apparatus for inputting a text provided by the present application, by distributing a defined content segment and a user name to virtual keys on a virtual keyboard, a user simply needs to select and click virtual keys in due order to achieve quick character input. Accordingly, the input efficiency of the input method is noticeably improved, under the constraint of meeting the risk control requirement that a defined content segment must be entered character by character.

BRIEF DESCRIPTION OF THE DRAWINGS

Other features, objectives and advantages of the present application will become more apparent upon reading the detailed description to non-limiting embodiments with reference to the accompanying drawings, wherein.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
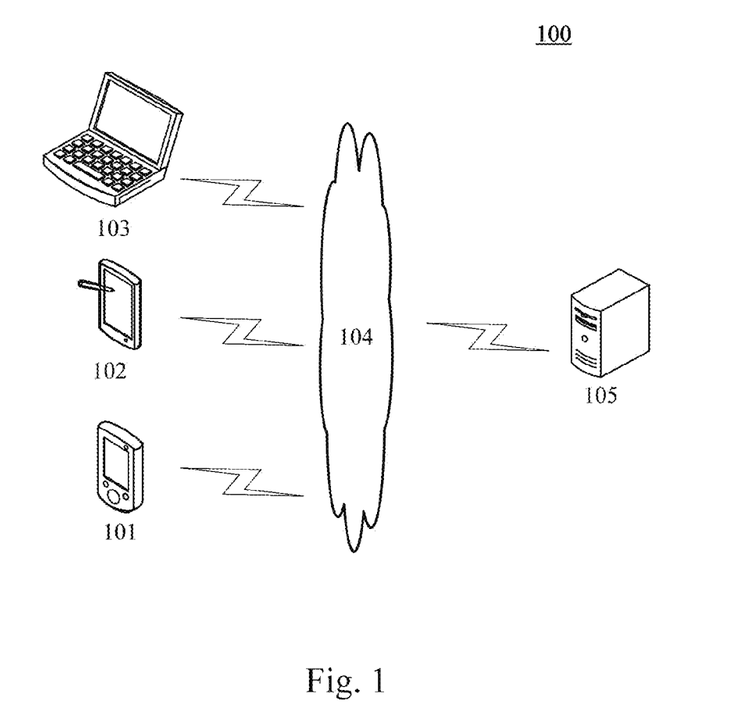
FIG. 1 is an architectural diagram of an exemplary system in which the present application may be implemented.

FIG. 1 shows an exemplary architecture of a system 100 which may be used by a text inputting method or a text inputting apparatus according to an embodiment of the present application.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to transmit or receive messages, etc. Various communication client applications, such as financial product applications, shopping applications, and online banking applications, may be installed on the terminal devices 101, 102 and 103.

The terminal devices 101, 102 and 103 may be various electronic devices capable of interacting with the server, including but not limited to, smart phones, tablet computers, laptop computers and desktop computers.

The server 105 may be a server providing various services, e.g., a backend server which provides support for a prompt text displayed on the terminal devices 101, 102 and 103. The backend server may provide the prompt text for a user to input based on the prompt text. After the inputting by the user based on the prompt text, the backend server verifies the input text by the user, and allows the user to proceed to next operation only when the input text is exactly the same to the prompt text.

It should be noted that the method for inputting a text provided by the embodiment of the present application is generally executed by the terminal devices 101, 102, 103, and accordingly, an apparatus for inputting a text is generally installed in the terminal devices 101, 102 and 103.

It should be appreciated that the numbers of the terminal devices, the networks and the servers in FIG. 1 is merely illustrative. Any number of terminal devices, networks and servers may be provided based on the actual requirements.

Figure 2:
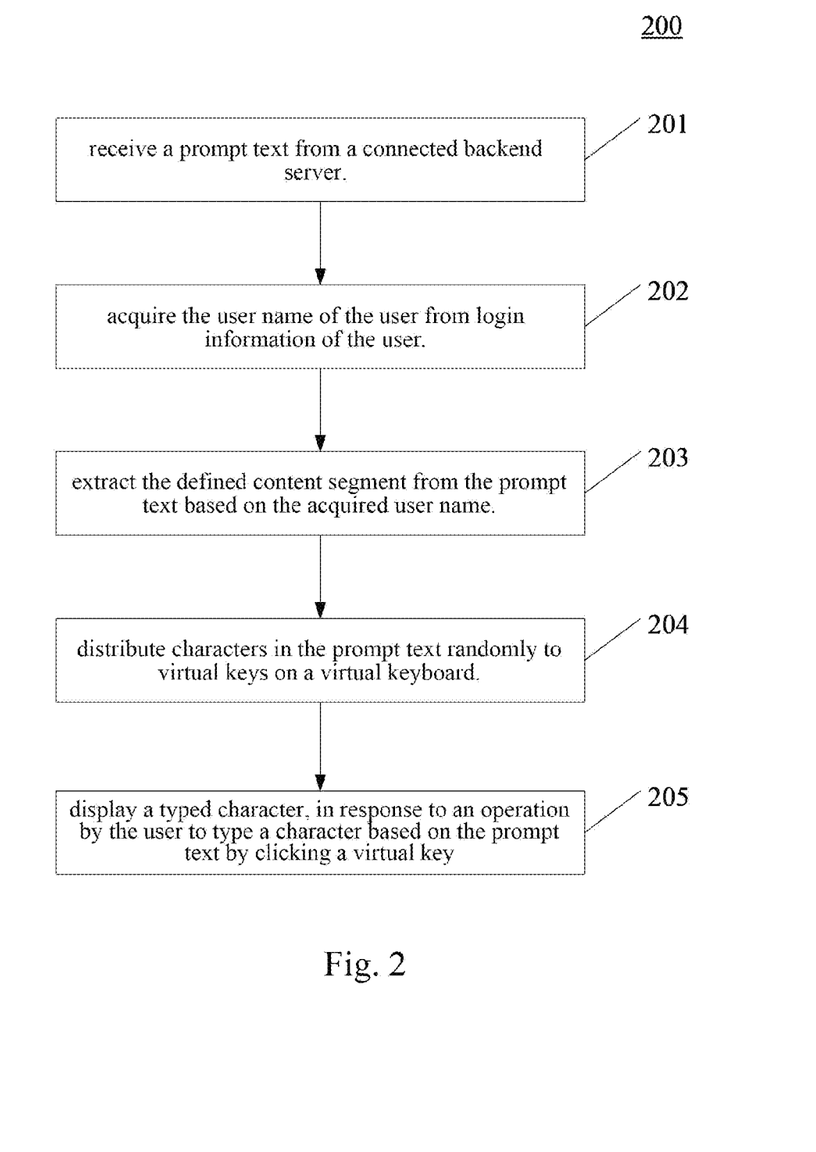
FIG. 2 is a flowchart of a method for inputting a text according to one embodiment of the present application.

With further reference to FIG. 2, a flow 200 of the method for inputting a text according to an embodiment of the present application is illustrated. The method for inputting a text comprises the following steps:

Step 201, receive a prompt text from a connected backend server.

In this embodiment, an electronic device (e.g., the terminal as illustrated in FIG. 1) on which the method for inputting a text operate may receive a prompt text from a connected backend server through a wired or wireless connection, wherein, the prompt text includes a defined content segment and a user name of a user logged on the server. For example, a user acquires a prompt text from a backend server for inputting based on the prompt text when purchasing a wealth management product, after logging in a bank client. The concrete content of the prompt text is "I, Li Xiaoning, have read and clearly understood the information provided by the risk disclosure statement," wherein "Li Xiaoning" is the user name and "I" as well as "have read and clearly understood the information provided by the risk disclosure statement" are defined content segments.

In some optional implementations of this embodiment, characters included in the user name and characters included in the defined content segment are mixed. For example, the concrete content of the prompt text is "I, Li Xiaoning, have read and clearly understood information provided by the risk disclosure statement," wherein the user name "Li Xiaoning" is mixed with the defined content segments "I" and "have read and clearly understood the information provided by the risk disclosure statement." Under certain circumstances, it is possible to distribute a user name in a defined content segment.

Step 202, acquire the user name of the user from login information of the user.

In the present embodiment, the user fills in the user name when logging in. Therefore, the user may acquire the user name of the user from login information of the user after logging in.

Step 203, extract the defined content segment from the prompt text based on the acquired user name.

In the present embodiment, the prompt text includes two content parts: the user name and the defined content segment. The user name is acquired in step 202, therefore, the defined content segment may be acquired by filtering out the user name from the prompt text.

Step 204, distribute characters in the prompt text randomly to virtual keys on a virtual keyboard.

In the present embodiment, distribute characters in the prompt text randomly to virtual keys on a virtual keyboard. For example, there are 21 defined information sets respectively occupying a virtual key, including 20 Chinese characters in the defined content segment "I have read and clearly understood the information provided by the risk disclosure statement" and a drop-down button. The virtual keyboard may further include a delete key and an enter key. If the defined content segment is too long to be fully displayed on one page, it can be displayed on separate pages. For example, for a defined content segment of 35 characters, with one page displaying only 20 characters, the first 20 characters of the defined content segment are randomly distributed on the first page, and the last 15 characters of the defined content segment are randomly distributed on the second page.

In some optional implementations of this embodiment, the virtual keyboard may be arranged in a grid form, and characters included in the user name may be displayed on consecutive virtual keys. For example, the user name may be displayed horizontally and consecutively on the virtual keys. A user name with no more than 4 characters is fully displayed, and the first 4 characters of a user name with more than 4 characters are displayed.

Step 205, display a typed character, in response to an operation by the user to type a character based on the prompt text by clicking a virtual key.

In the present embodiment, when the user types a character based on the prompt text by clicking a virtual key, the typed character is displayed on a terminal screen. On a touch screen terminal, the user may also select a character by sliding. For example, when inputting the user name, the user may select by sliding since the user name is arranged consecutively.

In some optional implementations of this embodiment, the virtual key displaying the typed character is set to a non-clickable state, in response to the operation by the user's clicking the virtual key to type the character based on the prompt text. The virtual key displaying a deleted character is set to a clickable state, in response to an operation by the user's clicking the virtual key to delete a character. For example, the virtual key displaying a character clicked and selected by the user is set to a non-clickable state, upon a repeated click on the virtual key by the user, the character will not be typed, and may be displayed in grey on the keyboard. If the user deletes a typed character, the virtual key displaying the deleted character will be restored to a clickable state for another clicking input.

In some optional implementations of this embodiment, a complete user name is displayed, in response to the user's clicking on any character in the user name displayed on the virtual keyboard. For example, the user name as a whole may be displayed on a long key, and the complete user name will be displayed when the user clicks the long key.

Figure 3:
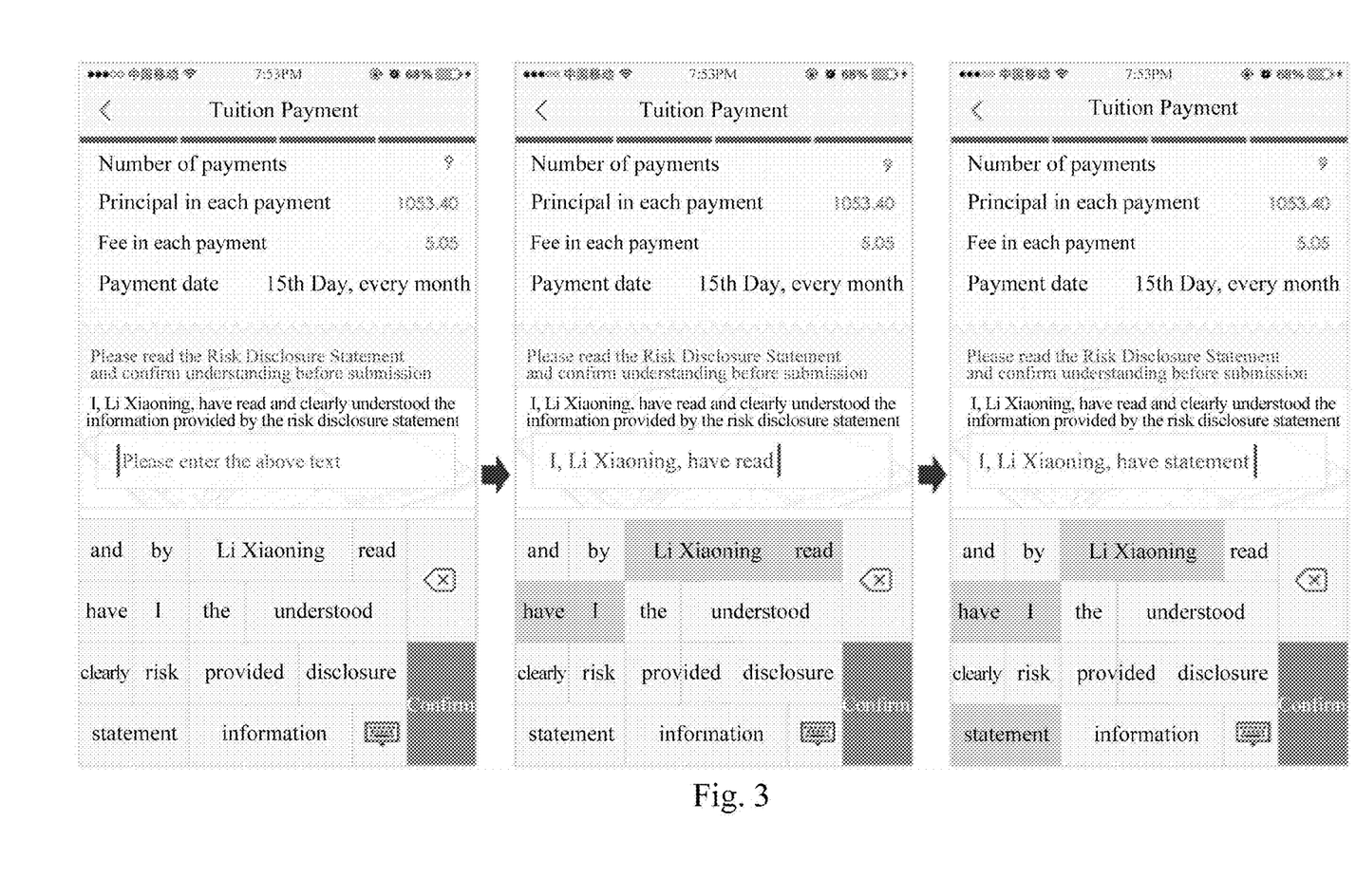
FIG. 3 is a schematic diagram of an application scenario of the method for inputting a text according to the present application.

With further reference to FIG. 3, a schematic diagram of an application scenario of the method for inputting a text according to the embodiment is shown. In the application scenario of FIG. 3, a terminal obtains the prompt text "I, Li Xiaoning, have read and clearly understood the information provided by the risk disclosure statement" to be entered by a user into an input box from a server, wherein "Li Xiaoning" is the user name, and "I" as well as "have read and clearly understood the information provided by the risk disclosure statement" are both defined content segments. Distribute the user name and the defined content segments randomly to a virtual keyboard arranged in a grid form. The user name "Li Xiaoning" as a long key which occupies three consecutive grid positions, and each character in the defined content segments is displayed on a virtual key and occupies a grid position. When the user clicks and selects a character based on the prompt text, the selected character is displayed in the input box, and the selected character becomes grey and unavailable to be select again. If the user-entered character is different from the prompt text, it is displayed in a different color.

With the methods provided to the users by the above embodiments of the present application, through randomly breaking up the keyboard text information, the user is to some extent reminded and risk is avoided. In addition, selecting a character by clicking a visual keyboard improves the speed and accuracy of text input.

Figure 4:
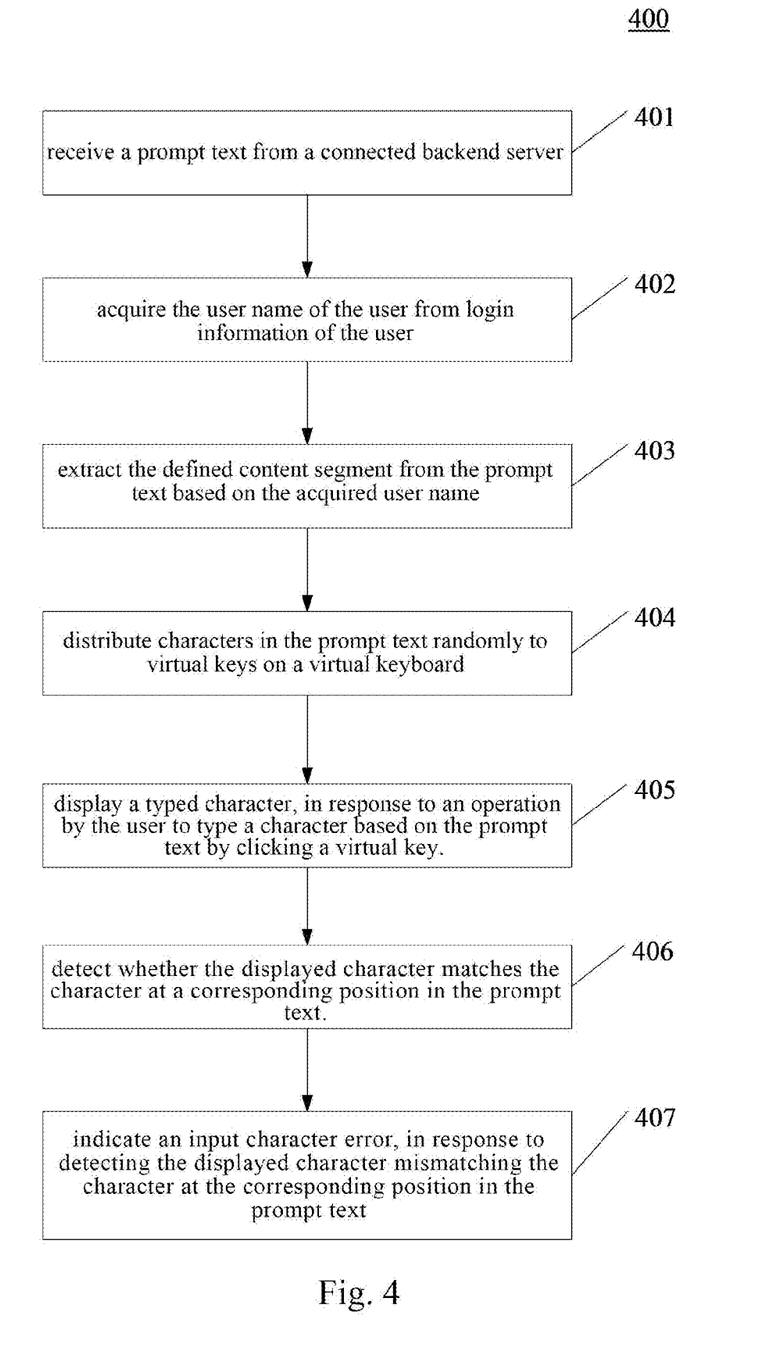
FIG. 4 is a flowchart of the method for inputting a text according to another embodiment of the present application.

With further reference to FIG. 4, a flow 400 of the method for inputting a text according to another embodiment of the present application is illustrated. The flow 400 of the method for inputting a text includes the following steps:

Step 401, receive a prompt text from a connected backend server.

Step 402, acquire the user name of the user from login information of the user.

Step 403: extract the defined content segment from the prompt text based on the acquired user name.

Step 404, distribute characters in the prompt text randomly to virtual keys on a virtual keyboard.

Step 405, display a typed character, in response to an operation by the user to type a character based on the prompt text by clicking a virtual key.

Steps 401-405 are substantially the same to steps 201-205, thus detailed descriptions thereof is not repeated.

Step 406, detect whether the displayed character matches the character at a corresponding position in the prompt text.

In the present embodiment, comparing every typed and displayed character with the prompt text. If the character at the corresponding position is different, the displayed character mismatches the character at the corresponding position in the prompt text. There is no need to wait until the user finishes input and clicks to verify. For example, in FIG. 3, the eighth character entered by the user is "clearly," while the eighth character in the prompt text is "read," here, the displayed character mismatches the prompt text.

Step 407, indicate an input character error, in response to detecting the displayed character mismatching the character at the corresponding position in the prompt text.

In the present embodiment, an input character error is indicated, in response to detecting the displayed character mismatching the character at the corresponding position in the prompt text. Multiple indication approaches are possible, such as, indicating an input error by a pop-up window, or indicating an input error by a terminal vibration.

In some optional implementations of this embodiment, an incorrectly input character is displayed in a color different from a color of a correctly input character. For example, the characters displayed in an input box are in black, and an incorrectly input character is displayed in red.

It is noted in FIG. 4, comparing with the embodiment illustrated in FIG. 2, the flow 400 of the method for inputting a text of the present embodiment highlights the process of verifying the input characters. Therefore, the solution described by the present embodiment may indicate an input error promptly rather than waiting to verify until the user clicks to confirm, thus improving the efficiency of the user's input operation.

Figure 5:
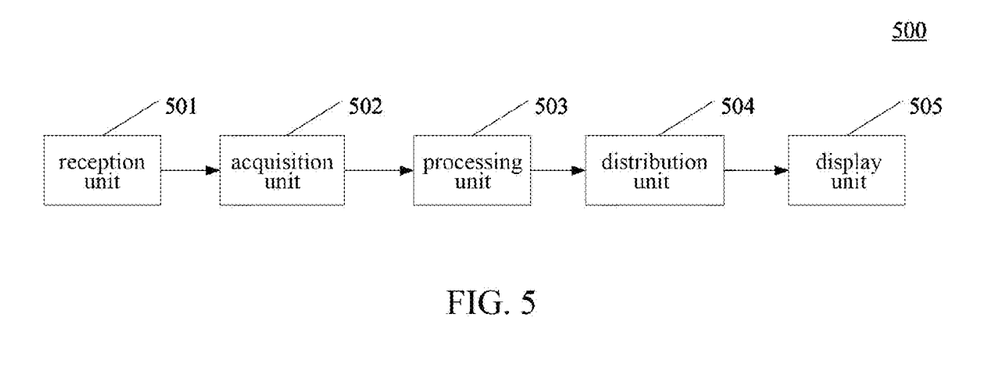
FIG. 5 is a schematic structural diagram of an apparatus for inputting a text according to one embodiment of the present application.

With further reference to FIG. 5, as an implementation to the methods illustrated in the above figures, the present application provides an embodiment of an apparatus for inputting a text. The apparatus embodiment corresponds to the method embodiment illustrated in FIG. 2, and is particularly applicable to various electronic devices.

As illustrated in FIG. 5, the apparatus 500 for inputting a text of the present embodiment includes: a reception unit 501, an acquisition unit 502, a processing unit 503, a distribution unit 504 and a display unit 505, wherein the reception unit 501 is configured to receive a prompt text from a connected backend server, the prompt text including a defined content segment and a user name of a user logged on the server. The acquisition unit 502 is configured to acquire the user name of the user from login information of the user. The processing unit 503 is configured to extract the defined content segment from the prompt text based on the acquired user name. The distribution unit 504 is configured to distribute characters in the prompt text randomly to virtual keys on a virtual keyboard. The display unit 505 is configured to display a typed character, in response to an operation by the user to type a character based on the prompt text by clicking a virtual key.

In the present embodiment, the reception unit 501 receives a prompt text for a user to input and acquires a user name from the acquisition unit 502. The processing unit 503 extracts a defined content segment from the prompt text. The distribution unit 504 input a result of the processing unit 503 on a virtual keyboard. The input character by the user is displayed by the display unit 505.

In some optional implementations of this embodiment, the apparatus 500 further includes: a control unit, configured to set the virtual key displaying the typed character to a non-clickable state, in response to the operation by the user's clicking the virtual key to type the character based on the prompt text; set the virtual key displaying a deleted character to a clickable state, in response to an operation by the user's clicking the virtual key to delete a character.

In some optional implementations of this embodiment, the apparatus 500 further includes: a detection unit, configured to detect whether the displayed character matches the character at a corresponding position in the prompt text; and an indication unit, configured to indicate an input character error, in response to detecting the displayed character mismatching the character at the corresponding position in the prompt text.

In some optional implementations of this embodiment, the above indication unit is further configured to: display an incorrectly input character in a color different from a color of a correctly input character.

In some optional implementations of this embodiment, characters included in the user name and characters included in the defined content segment are mixed.

In some optional implementations of this embodiment, the virtual keyboard is arranged in a grid form, and characters included in the user name are displayed on consecutive virtual keys.

In some optional implementations of this embodiment, the display unit 505 is further configured to: display a complete user name, in response to the user's clicking on any character in the user name displayed on the virtual keyboard.

Figure 6:
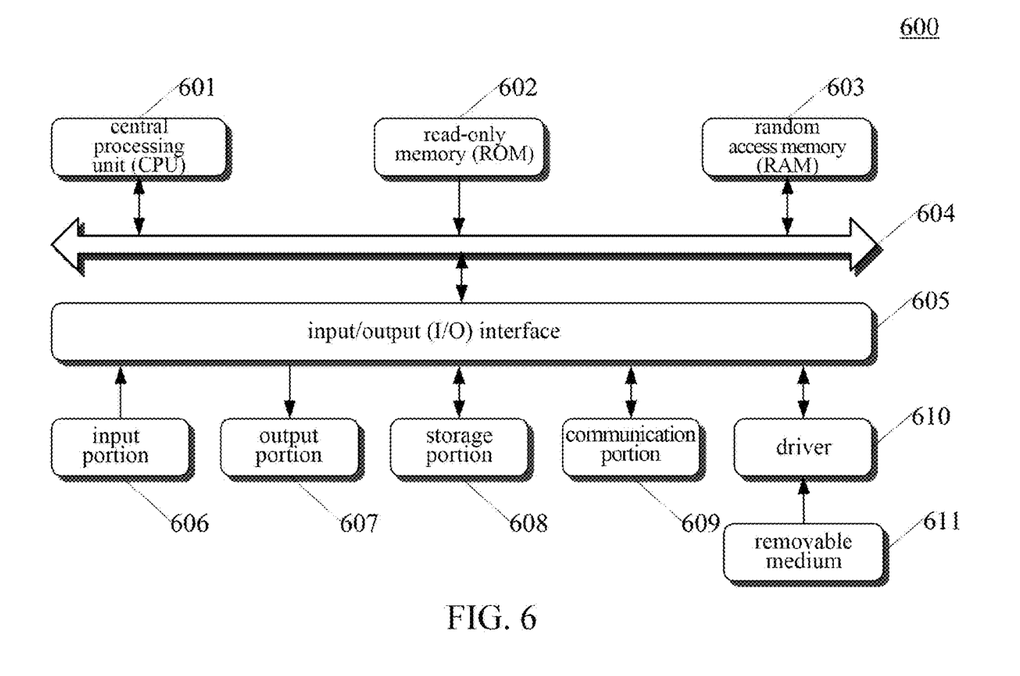
FIG. 6 is a schematic structural diagram of a computer system adapted to implement a terminal device of the embodiments of the present application.

Referring to FIG. 6, a schematic structural diagram of a computer system 600 adapted to implement a terminal device of the embodiments of the present application is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above functions as defined by the methods of the present application.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a reception unit, an acquisition unit, a processing unit, a distribution unit and a display unit, where the names of these units or modules are not considered as a limitation to the units or modules. For example, the reception unit may also be described as "a unit for receiving a prompt text from a connected backend server."

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: receive a prompt text from a connected backend server, the prompt text including a defined content segment and a user name of a user logged on the server; acquire the user name of the user, from login information of the user; extract the defined content segment from the prompt text, based on the acquired user name; distribute characters in the prompt text randomly to virtual keys on a virtual keyboard; and display a typed character, in response to an operation by the user to type a character based on the prompt text by clicking a virtual key.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for inputting a text, comprising:
    receiving a prompt text from a connected backend server, the prompt text including a defined content segment and a user name of a user logged on the server;
    acquiring the user name of the user from login information of the user;
    extracting the defined content segment from the prompt text based on the acquired user name;
    distributing characters in the prompt text randomly to virtual keys on a virtual keyboard;
    displaying a typed character, in response to an operation by the user to type a character based on the prompt text by clicking a virtual key of the virtual keys on the virtual keyboard,
    setting the virtual key displaying the typed character to a non-clickable state while keeping the virtual key displaying the typed character, in response to the operation by the user to type the character based on the prompt text by clicking the virtual key; and
    setting the virtual key displaying a deleted character to a clickable state, in response to an operation by the user to delete a character by clicking the virtual key.

2. The method for inputting a text according to claim 1, further comprising:
    detecting whether the displayed character matches the character at a corresponding position in the prompt text; and
    indicating an input character error, in response to detecting the displayed character mismatching the character at the corresponding position in the prompt text.

3. The method for inputting a text according to claim 2, wherein the indicating an input character error comprises:
    displaying an incorrectly input character in a color different from a color of a correctly input character.

4. The method for inputting a text according to claim 1, wherein characters included in the user name displayed on the consecutive virtual keys and characters included in the defined content segment are mixed.

5. The method for inputting a text according to claim 1, wherein the displaying the typed character comprises:
    displaying in an input box a complete user name, in response to clicking by the user on any one character in the user name displayed on the virtual keyboard.

6. The method for inputting a text according to claim 1, wherein the virtual keyboard is arranged in a grid form, and characters included in the user name are displayed on consecutive virtual keys.

7. An apparatus for inputting a text, the apparatus comprising:
    at least one processor; and
    a memory storing instructions, which when executed by the at least one processor, cause the at least one processor to perform operations, the operations comprising:
    receiving a prompt text from a connected backend server, the prompt text including a defined content segment and a user name of a user logged on the server;
    acquiring the user name of the user from login information of the user;
    extracting the defined content segment from the prompt text based on the acquired user name;
    distributing characters in the prompt text randomly to virtual keys on a virtual keyboard;
    displaying a typed character, in response to an operation by the user to type a character based on the prompt text by clicking a virtual key of the virtual keys on the virtual keyboard,
    setting the virtual key displaying the typed character to a non-clickable state while keeping the virtual key displaying the typed character, in response to the operation by the user to type the character based on the prompt text by clicking the virtual key; and
    setting the virtual key displaying a deleted character to a clickable state, in response to an operation by the user to delete a character by clicking the virtual key.

8. The apparatus for inputting a text according to claim 7, the operations further comprising:
    detecting whether the displayed character matches the character at a corresponding position in the prompt text; and
    indicating an input character error, in response to detecting the displayed character mismatching the character at the corresponding position in the prompt text.

9. The apparatus for inputting a text according to claim 7, wherein the indicating an input character error comprises:
    displaying an incorrectly input character in a color different from a color of a correctly input character.

10. The apparatus for inputting a text according to claim 7, wherein characters included in the user name displayed on the consecutive virtual keys and characters included in the defined content segment are mixed.

11. The apparatus for inputting a text according to claim 7, wherein the displaying the typed character comprises:
    display in an input box a complete user name, in response to clicking by the user on any one character in the user name displayed on the virtual keyboard.

12. A non-transitory computer storage medium storing a computer program, which when executed by one or more processors, cause the one or more processors to perform operations, the operations comprising:
    receiving a prompt text from a connected backend server, the prompt text including a defined content segment and a user name of a user logged on the server;
    acquiring the user name of the user from login information of the user;

extracting the defined content segment from the prompt text based on the acquired user name;

distributing characters in the prompt text randomly to virtual keys on a virtual keyboard;

displaying a typed character, in response to an operation by the user to type a character based on the prompt text by clicking a virtual key of the virtual keys on the virtual keyboard, setting the virtual key displaying the typed character to a non-clickable state while keeping the virtual key displaying the typed character, in response to the operation by the user to type the character based on the prompt text by clicking the virtual key; and setting the virtual key displaying a deleted character to a clickable state, in response to an operation by the user to delete a character by clicking the virtual key.

13. The non-transitory computer storage medium according to claim 12, the operations further comprising:

detecting whether the displayed character matches the character at a corresponding position in the prompt text; and indicating an input character error, in response to detecting the displayed character mismatching the character at the corresponding position in the prompt text.

14. The non-transitory computer storage medium according to claim 13, wherein the indicating an input character error comprises:

displaying an incorrectly input character in a color different from a color of a correctly input character.

15. The non-transitory computer storage medium according to claim 12, wherein characters included in the user name displayed on the consecutive virtual keys and characters included in the defined content segment are mixed.

* * * * *